United States Patent [19]
Friedmann et al.

[11] 3,791,793
[45] Feb. 12, 1974

[54] ADAPTIVE FEED FORWARD-FEEDBACK CONTROL OF THE CONCENTRATION OF A SELECTED ION OF A SOLUTION

[75] Inventors: Paul G. Friedmann, Wyndmoor, Pa.; William C. Cohen, Willingboro, N.J.

[73] Assignee: Leeds & Northrup Company, Philadelphia, Pa.

[22] Filed: Jan. 31, 1972

[21] Appl. No.: 222,234

[52] U.S. Cl. .............................. 23/230 A, 23/253 A
[51] Int. Cl. ..................... G05b 13/02, G05d 21/02
[58] Field of Search ...................... 23/253 A, 230 A

[56] References Cited
UNITED STATES PATENTS
3,656,911  4/1972  Hobbs ............................. 23/253 A FOREIGN PATENTS OR APPLICATIONS
559,001  1/1944  Great Britain .................. 23/253 A
638,073  5/1950  Great Britain .................. 23/253 A OTHER PUBLICATIONS
Shinskey, F. G., Process Control Systems, McGraw-Hill; 1967, pp. 280-281.
Shinskey, F. G., "Feedforward Control of pH," Instrumentation Technology, June, 1968, pp. 65-69.
Shinskey et al., "Adaptive Feedback Applied to Feedforward pH Control," 1970 Phila. ISA Conf., Preprint pp. 565-570.
Williams, J. J. et al., Progress in Direct Digital Control, ISA, 1959, page 203.
Wilson H. S. et al., ISA Preprint 11.1-2-64, 10/12/64.

*Primary Examiner*—Barry S. Richman
*Attorney, Agent, or Firm*—William G. Miller, Jr.; Raymond F. MacKay

[57] ABSTRACT

A control system for controlling the flow of reagent into a reactor for the correction of the concentration of a selected ion in the influent to the reactor so as to provide a desired concentration in the effluent stream from the reactor. A feedback controller having proportional and reset responses is provided to control the flow of reagent to maintain the logarithm of the concentration of the ion in the effluent at its set point. The control signal from the feedback controller is multiplied by a feedforward control signal responsive to changes in the logarithm of the ion concentration of the influent, the effluent set point, and influent flow. The resulting product is then summed with the feedforward control signal to provide the final control signal required to control a linear operator for modification of the reagent flow to maintain the logarithm of the ion concentration in the effluent at the set point.

11 Claims, 3 Drawing Figures

3,791,793

ADAPTIVE FEED FORWARD-FEEDBACK CONTROL OF THE CONCENTRATION OF A SELECTED ION OF A SOLUTION

BACKGROUND OF THE INVENTION

Conventionally, systems for controlling the concentration of a selected ion of a solution, such as pH control systems, have used simple feedback control in which the pH of the effluent from a reactor is compared to a set point and a control signal which may include both proportional and integral response is fed back to a valve which controls the flow of reagent to the reactor. In many pH control systems, for example, disturbances in the flow of influent to the reactor or the composition of the influent stream as well as variations in the strength of the reagent and changes which may occur in the buffering capacity of the influent must be taken into account in the control of the reagent flow in order to accomplish suitable control of the effluent. In order to provide modification of the normal feedback control to take into account such disturbances, the addition of feedforward control has been attempted by others in the past. The systems which have been provided to incorporate both feedforward and feedback control usually provided only for a summation of the feedforward and feedback control signals and the resulting control did not suitably adapt to changes in reagent strength or changes in the buffering capacity of the influent, for example. Some systems have been directed solely to the operation of equal percentage valves for the control of the reagent strength and have not been useful to control linear operators in which the reagent is modified by a valve or metering pump as a linear function of the control signal to which the operator is responding.

It is, therefore, an object of this invention to provide an improved feedforward-feedback control of the negative logarithm of the concentration, pX, of a selected ion, X, of a solution.

A further object of this invention is the provision of an adaptive feedforward-feedback control of pH which will manipulate a linear operator in a manner which will suitably adapt for changes in reagent strength as well as changes in the buffering capacity of the influent stream.

SUMMARY OF THE INVENTION

The present invention provides a method for controlling to a set point the logarithm of the concentration of a selected ion in the effluent from a reactor process in which the logarithm of the concentration of that ion in the influent is modified by the addition of a reagent and the flow of the reagent is a linear function of the magnitude of a final control signal. This method comprises the steps of producing in response to the logarithm of the ion concentration in the influent a feedforward control signal indicative of the reagent flow required to maintain the logarithm of the ion concentration in the effluent at its set point under certain process conditions and the producing of a final control signal for modifying the reagent flow as a function of the product of the feedforward control signal and a function of the deviation of the logarithm of the ion concentration in the effluent from its set point. The invention also provides means for carrying out the above mentioned steps.

DESCRIPTION OF THE PREFERRED EMBODIMENT

For the purposes of this description and the claims pX will be used to indicate the negative logarithm of the concentration or activity of a selected ion, X, which is measured by an electrode system which generates a Nernstian response. For example, if the selected ion is the hydrogen ion, pX becomes the well known quantity pH. X can, of course, be any of a number of other ions such as chloride, for example. All reference to the logarithm of the concentration is intended to refer to the negative logarithm of the concentration where polarity is of significance since, for example, pH is equal to the negative logarithm of the hydrogen ion concentration.

Figure 1:
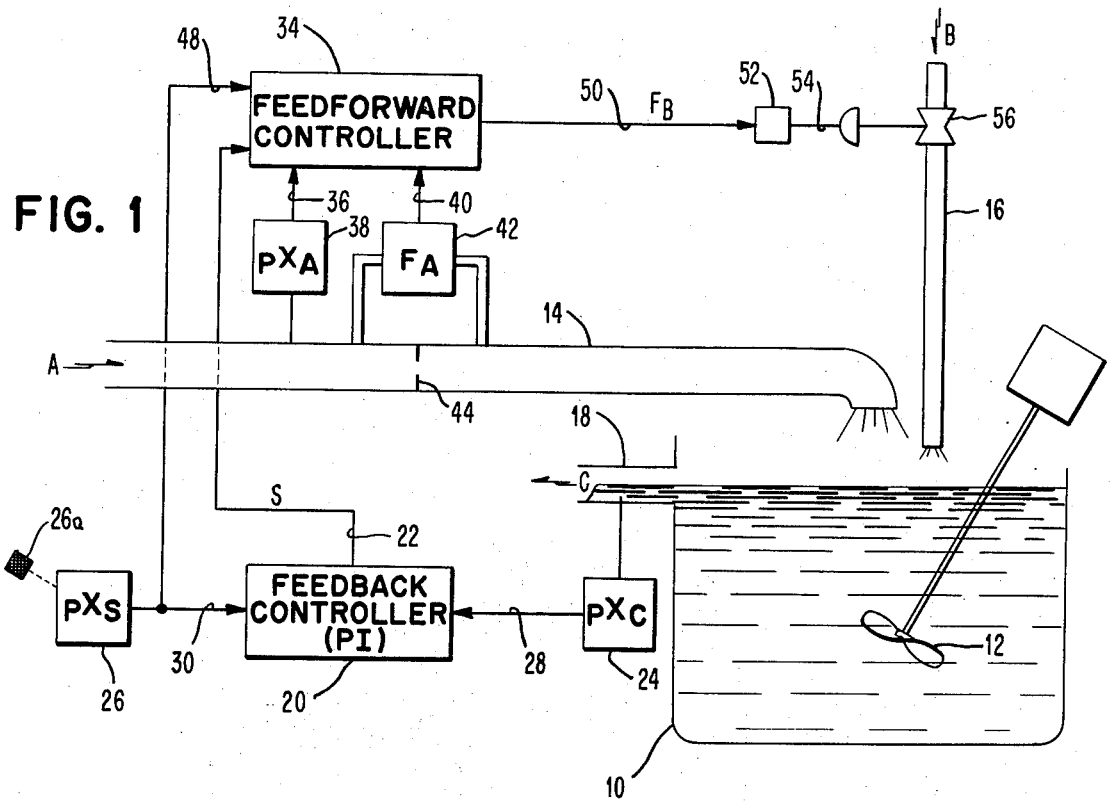
FIG. 1 is a diagram of a system for controlling the logarithm of the concentration of a specific ion of a solution in which the control elements are shown in block diagram form.

In FIG. 1 a continuous stirred-tank reactor is used for pX control. The tank 10, which is continuously stirred by the motor operated stirrer 12 provides the necessary retention time and mixing to provide for a control of the pX of the liquid introduced by way of the influent stream A flowing through pipe 14. The control is accomplished by modifying the flow of the reagent B into the reactor by way of the pipe 16 so that the effluent which is carried away from the reactor by way of pipe 18 forms an effluent stream C whose pX is maintained at a predetermined set point.

A feedback controller 20 providing both proportional and integral (reset) response produces a feedback signal S on its output line 22 as a proportional and integral function of the difference between the pH of the effluent stream, as measured by the pH measuring element 24, and the pH set point, as established by the adjustment of knob 26A on the signal source 26. Thus, the controller 20 responds to a signal on line 28 indicative of the pX of the effluent, $pX_C$, and the signal on line 30 from the signal source 26 indicative of the set point, $pX_S$, representing the desired pX of the effluent.

The feedback control is preferably of the type which provides a zero output signal S whenever the effluent pX is at its set point; namely, when the signal on line 28 agrees with the signal on line 30, assuming no integral response has been accumulated. Thus, the input from line 22 to the feedforward controller 34 will be zero unless the pX of the effluent deviates from the set point.

The feedforward controller 34 is responsive to the pX of the influent stream, $pX_A$, by virtue of the input on line 36 from the pX measuring element 38, which is arranged to detect the pX of the influent. The controller 34 likewise responds to changes in the flow of influent in pipe 14 by virtue of the input signal on line 40 from the flow measuring device 42 which responds to the pressure differential across orifice 44.

The feedforward controller is also shown as being responsive to a signal on line 48 which is representative of the set point for the pX of the effluent and may, as shown in FIG. 1, be derived by connection through line 30 to signal source 26 which provides the set point signal, $pX_S$.

The manner in which the feedforward controller 34 responds to its input signals will be further explained in connection with the description of FIG. 2. However, as shown in FIG. 1, the feedforward controller 34 produces a final control signal $F_B$ on line 50 which causes the electro-pneumatic converter 52 to provide on line 54 a corresponding pneumatic signal to the diaphragm operated valve 56, which is preferably a valve which adjusts the flow of reagent through pipe 16 as a linear function of the magnitude of the pneumatic signal on line 54.

Figure 2:
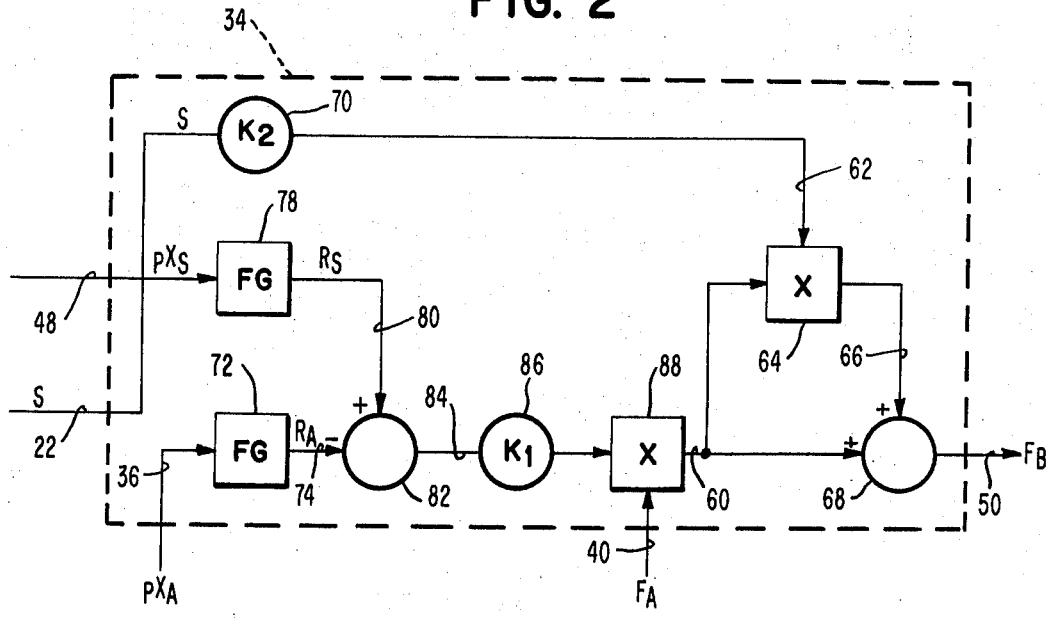
FIG. 2 is a functional diagram of one form which the feedforward controller may take.

In FIG. 2, there is shown a functional block diagram of one form which the feedforward controller 34 of FIG. 1 may take. In FIG. 2 there is provided a means for producing on line 60, a feedforward control signal which is responsive to the pX of the influent stream, $pX_A$, and to the magnitude of the flow of the influent, $F_A$, as well as the pX set point for the effluent, $pX_S$.

As shown in FIG. 2, the feedforward control signal on line 60 is multiplied by the feedback control signal on line 62 by multiplier 64 with the product of that multiplication appearing on line 66 as an input to the summer 68. The summer 68 operates to sum the signal on line 66 with the feedforward control signal on line 60 so that the resulting sum is a signal $F_B$; namely, the final control signal. Desirably, $F_B$ varies linearly with the required magnitude of reagent flow needed to correct the pX of the influent to produce the desired pX in the effluent.

As shown in FIG. 2, the feedback control signal appearing on line 62 is obtained by multiplying the feedback signal S from the feedback controller 20 by a gain factor $K_2$, introduced by unit 70, which may be a potentiometer, so that the signal supplied on line 62 is representative of $K_2S$.

It will be evident from FIG. 2 that the signal on line 50 is formed from the sum of the feedforward control signal and the product of the feedforward and feedback control signals. The feedforward control signal on line 60 is produced in accordance with the algorithm $K_1F_A(R_S-R_A)$ where:

$F_A$ = flow of reagent, vol./time
$R_S$ = vol. reagent/vol. influent, at effluent pH set point according to titration curve of influent at $pX_o$. (FIG. 3)
$R_A$ = vol. reagent/vol. influent, at influent pX according to titration curve. (FIG. 3)
$K_1$ = feedforward gain.

For titration of a strong acid by a strong base, when X is the hydrogen ion, the following approximation is valid.

$R_S - R_A = (10^{-pH_A} - 10^{-pH_S})/10^{(pH_B-14)}$ where:
$pH_A$ = pH of the influent.
$pH_S$ = pH set point of effluent.
$pH_B$ = pH of reagent.

Figure 3:
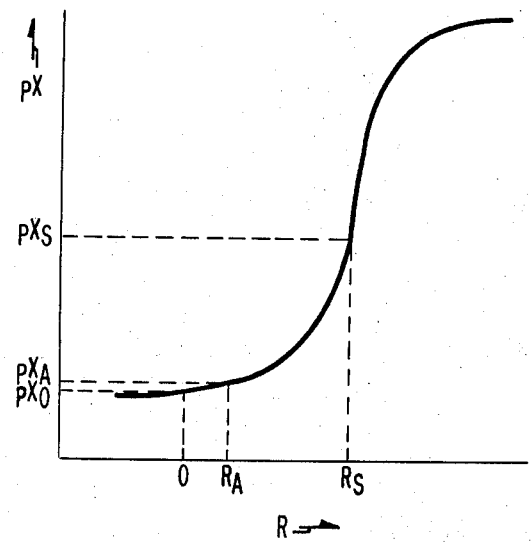
FIG. 3 is a graphic representation of the titration curve in which the volume of the reagent flow per unit volume of influent flow is plotted along the abscissa and pX, the negative logarithm of the concentration of a selected ion, X, plotted along the ordinate.

Referring to the titration curve of FIG. 3, there is illustrated the relationship between the terms $R_S$ and $R_A$. It will also be evident from FIG. 3 that the area of the titration curve which is significant is essentially exponential in shape. Thus, the function generator 72 provides an output signal on line 74 which is exponentially related to the input signal on line 36 representative of the measured pX in the influent stream. Similarly, the function generator 78 provides on line 80 a signal which is exponentially related to the signal on line 48 representative of the pX set point, $pX_S$.

The summer 82 operates to sum the signals from lines 80 and 74. Since the signal on line 74 is of a sign opposite that on line 80, the output on line 84 is representative of the quantity $(R_S - R_A)$. That signal is then multiplied by a gain factor $K_1$ which may be provided by unit 86, which may be a potentiometer, so that the input to the multiplier 88 from the unit 86 is representative of the quantity $K_1(R_S - R_A)$. The other input to the multiplier 88 is from line 40 and is representative of the measured flow in the influent pipe 14. Thus, there is produced on the output line 60 of multiplier 88 the feedforward control signal representing the quantity $K_1F_A(R_S-R_A)$.

The previously explained multiplication of the feedforward control signal and feedback control signal by multiplier 64 and the summation of that product with the feedforward control signal produces a final control signal on line 50 which represents the algorithm $K_1F_a(R_S-R_A)(1+K_2S)$.

By providing a final control signal which is a function of the product of the feedforward control signal and the feedback control signal, the feedforward control signal is adapted by the feedback control signal so as to provide a control which will correct the reagent flow to correct for changes in the strength of the reagent to changes in the buffering capacity of the influent as well as other changes which would have the effect of changing the titration curve of FIG. 3. This adaptation of the feedforward controller will cause that controller to properly adjust the reagent flow subsequent to those disturbances.

Viewing the control system in another way, it may be considered that the conventional feedforward-feedback control of the reagent flow which would involve the summation of the feedforward and feedback control signals has been modified by making the feedback control signal adaptive since the feedback control signal is, as shown in FIG. 2, multiplied by the feedforward control signal before the summation is carried out.

Using the pH control system described above may, under certain system conditions, allow for the simplification of the feedforward controller. For example, in many applications, such as waste neutralization, the effluent set point remains fixed and it would, therefore, be unnecessary to provide the signal $R_S$ on line 80. Instead, the gain $K_1$ could be altered to account for the absence of that signal. Similarly, the flow of influent may not vary over a range sufficient to significantly modify the operation of the feedforward control and hence the signal $F_A$ on line 40 could be omitted. In that situation any flow changes would be compensated for by the feedback control. Thus, under some situations the feedforward controller may be responsive to a single variable; namely, $pX_A$.

Those skilled in the art will recognize that the feedback controller may be any of a number of commercially available controllers which provide both proportional and reset responses. Similarly, the feedforward controller may take any of a number of forms. It may, for example, be a current adjusting type which produces an output signal which is a current of varying magnitude. Thus, $F_B$ may be presented to the converter 52 as a current which the converter must convert to a corresponding pneumatic signal for operation of the valve operator.

The functions shown in the block diagram of FIG. 2, are usually most easily carried out with voltage signals, thus, it may be necessary to convert the resulting signal $F_B$ to a current signal. Such requirements are related to the details of the design of the control system and are well known in the art.

We claim:

1. The method for controlling to a set point, the pX of the effluent from a reaction process in which the pX of the influent is modified by the addition of a reagent and the flow of the reagent is a linear function of the magnitude of a final control signal comprising the steps of:

producing in response to the pX of the influent a feedforward control signal indicative of the reagent flow required to maintain the pX of the effluent at its set point under certain process conditions, and producing a final control signal for modifying the reagent flow as a function of the weighted sum of said feedforward control signal and the product of said feedforward control signal and a function of the deviation of the pX of the effluent from said set point.

2. The method as set forth in claim 1 in which the step of producing the feedforward control signal is responsive to the pX of the influent and the magnitude of the influent flow to the reactor.

3. The method as set forth in claim 1 in which the step of producing a feedforward control signal is responsive to the pX of the influent, the magnitude of the influent flow to the reactor, and said set point.

4. The method as set forth in claim 1 in which the function of the deviation of the pX of the effluent from said set point includes proportional and reset responses to the deviation of the pX of the effluent from its set point.

5. The method for controlling to a set point, the pX of the effluent from a reactor process in which the pX of the influent is modified by the addition of a reagent and the flow of the reagent is a linear function of the magnitude of a final control signal comprising the steps of, producing in response to the pX of the influent, the magnitude of the influent flow, and the set point, a feedforward control signal indicative of the reagent flow required to change the pX of the influent toward the set point, producing a feedback control signal in accordance with the deviation of the pX of the effluent from said set point, and producing a final control signal for modifying the flow of said reagent as a function of the sum of said feedforward control signal and the product of said feedforward and feedback control signals.

6. A system for controlling the pX of the effluent from a process reactor at a predetermined set point by linearly varying the reagent flow to the reactor in response to a final control signal comprising:

means responsive to the pX of the influent for producing a feedforward control signal indicative of the reagent flow required to change the pX of the influent to the set point under certain process conditions, and means for producing said final control signal as a function of the weighted sum of said feedforward control signal and the product of said feedforward control signal and a function of the deviation of the pX of the effluent from said set point.

7. A system as set forth in claim 6 in which the means for producing the feedforward control signal is responsive to the pX of the influent and the magnitude of the influent flow to the reactor.

8. A system as set forth in claim 6 in which the means for producing the feedforward control signal is responsive to the pX of the influent, the magnitude of the influent flow to the reactor and said set point.

9. A system for controlling the pX of the effluent from a process reactor at a predetermined set point by linearly varying the reagent flow to the reactor in response to a final control signal comprising, means for producing a feedforward control signal in response to the pX of the influent, means for producing a feedback control signal in proportion to the deviation of the pX of the effluent from its set point and the integral of said deviation, and means for summing said feedforward control signal with the product of said feedforward control signal and said feedback control signal to produce said final control signal.

10. A system for controlling the pX of the effluent from a process reactor at a predetermined set point by linearly varying the reagent flow to the reactor in response to a final control signal comprising:

means for producing a feedforward control signal in response to the magnitude of the influent flow to the reactor, the pX of the influent, and said set point, means for producing a feedback control signal in accordance with the deviation of the pX of the effluent from said set point, and means for combining said feedforward control signal and said feedback control signal to produce said final control signal as a function of the product of said feedforward control signal and said feedback control signal, said function of the product of said feedforward control signal and said feedback control signal including the sum of the feedforward control signal and the product of the feedforward control signal and the feedback control signal.

11. A system as set forth in claim 10 in which the means for producing a feedback control signal has both proportional and reset response to the deviation of the pX of the effluent from its set point.

* * * * *